(12) United States Patent
Hood et al.

(10) Patent No.: US 6,845,986 B2
(45) Date of Patent: Jan. 25, 2005

(54) LOW TORQUE SEAL ASSEMBLY

(75) Inventors: Charles Robin Hood, Bullard, TX (US); Donald G. Wells, Longview, TX (US); Mark N. Gold, Hallsville, TX (US)

(73) Assignee: Stemco LLC, Longview, TX (US)

( * ) Notice: Subject to any disclaimer, the term of this patent is extended or adjusted under 35 U.S.C. 154(b) by 7 days.

(21) Appl. No.: 10/134,134

(22) Filed: Apr. 26, 2002

(65) Prior Publication Data

US 2003/0201609 A1 Oct. 30, 2003

(51) Int. Cl.$^7$ .............................................. F01D 11/02
(52) U.S. Cl. .................... 277/409; 277/412; 277/418; 384/480; 384/144
(58) Field of Search ............................... 277/423, 409, 277/410, 411, 412, 418, 419, 420, 421; 384/480, 478, 446, 144, 133

(56) References Cited

U.S. PATENT DOCUMENTS

| | | | |
|---|---|---|---|
| 4,379,600 A | * | 4/1983 | Muller ........................ 384/480 |
| 4,383,720 A | | 5/1983 | Ernst |
| 4,504,067 A | | 3/1985 | Cather, Jr. |
| 4,552,367 A | | 11/1985 | Fedorovich et al. |
| 4,721,314 A | | 1/1988 | Kanayama et al. |
| 4,739,998 A | | 4/1988 | Steusloff et al. |
| 4,770,548 A | | 9/1988 | Otto |
| 4,783,086 A | | 11/1988 | Bras et al. |
| 4,819,949 A | | 4/1989 | Otto |
| 4,844,480 A | | 7/1989 | Gralka |
| 4,895,460 A | * | 1/1990 | Grzina ........................ 384/132 |
| 5,004,248 A | | 4/1991 | Messenger et al. |
| 5,015,001 A | | 5/1991 | Jay |
| 5,024,364 A | | 6/1991 | Nash |
| 5,056,799 A | | 10/1991 | Takenaka et al. |
| 5,129,744 A | * | 7/1992 | Otto et al. .................. 384/486 |
| 5,139,275 A | | 8/1992 | Ehrmann et al. |
| 5,190,299 A | | 3/1993 | Johnston |
| 5,195,757 A | | 3/1993 | Dahll, V |
| 5,209,449 A | | 5/1993 | Hart |
| 5,290,047 A | * | 3/1994 | Duffee et al. ................ 277/419 |
| 5,427,387 A | | 6/1995 | Johnston |
| 5,577,741 A | | 11/1996 | Sink |
| 5,615,894 A | | 4/1997 | Vom Schemm |
| 5,676,472 A | * | 10/1997 | Solomon et al. ............. 384/607 |
| 5,799,951 A | | 9/1998 | Anderson |
| 5,997,005 A | | 12/1999 | Gold et al. |
| 6,015,153 A | | 1/2000 | Sharrer |
| 6,155,574 A | * | 12/2000 | Borgstrom et al. .......... 277/419 |
| 6,158,743 A | | 12/2000 | Anderson et al. |
| 6,170,833 B1 | | 1/2001 | Cox et al. |

FOREIGN PATENT DOCUMENTS

GB           2157373 A   *  10/1985    ..........  F16J/15/447

OTHER PUBLICATIONS

International Search Report mailed Sep. 5, 2003 corresponding to PCT/US 03/16818.
International Search Report mailed May 28, 2004 corresponding to PCT/US 03/13000.

* cited by examiner

Primary Examiner—William L. Miller
(74) Attorney, Agent, or Firm—John M. Harrington; Kilpatrick Stockton LLP

(57) ABSTRACT

A unitized seal assembly for use with roller or ball bearing assemblies is disclosed. The unitized seal assembly includes, among other things, a radially outer ring and a radially inner deflector ring. The outer ring includes a first shield element which defines a first sealing face. The radially inner deflector ring includes a second shield element which defines a second sealing face. The second sealing face is dimensioned and configured so as to correspond to the first sealing face such that when the first shield element is positioned in non-contacting proximity to the second shield element, a circuitous sealing labyrinth is formed between the first sealing face and the second sealing face.

48 Claims, 3 Drawing Sheets

LOW TORQUE SEAL ASSEMBLY

BACKGROUND OF THE INVENTION

1. Field of the Invention

The subject disclosure relates to unitized bearing seal assemblies, and more particularly to, a low torque seal assembly which utilizes a highly viscous fluid filled labyrinth path to maintain a seal and exclude contaminants from within an interior bearing chamber.

2. Background of the Related Art

Ball and roller bearing assemblies are well known in the art and have been used for many years in applications such as railway cars, crane wheels, and trucking. Bearing assemblies are typically provided as a self-contained unit and generally include a plurality of circumferentially-spaced balls or rollers confined between concentric outer and inner rings or cylinders. The concentric rings define an interior chamber for containing the rolling elements and supply smooth, hard, accurate surfaces for the balls or rollers to roll on. These surfaces are referred to as races or raceways. A uniform spacing is maintained between adjacent balls or rollers within the interior chamber by a cage or separator element and a lubricant such as grease is applied therein. The rolling elements are the most important component of the bearing assembly, because they transmit the loads from the moving parts of the machine to the stationary support. The balls are ideally uniformly spherical, but the rollers may be straight cylinders, or they may be tapered, cone-shaped or other forms depending upon the purpose of the design. Additionally, the balls or rollers can be provided in a single row or multiple rows.

Bearing assemblies are typically dimensioned and configured such that they can be installed by sliding the assembly over an axle journal and into a housing. The inner ring is typically engaged with the axle journal and the outer ring is engaged with the housing so as to enable the axle to rotate relative to the housing or vise versa. Bearing assemblies often operate in hostile environments, and this is particularly true when they are used in application such as railcars. As a result, the interior chamber which contains the rolling elements, must be sealed so that contaminants, such as dirt and water, are kept out of and lubricant is kept in.

U.S. Pat. No. 4,770,548 to Otto discloses a hydrodynamic seal which is suitable for closing the end of a tapered roller bearing assembly. The seal disclosed therein includes a seal case which is pressed into a counterbore formed in the end of the outer ring (cup) and an elastomeric sealing element. The elastomeric sealing element has a primary lip and a secondary lip which cooperate with a sealing surface on a thrust rib on the inner ring (cone) to effect a live seal along the surface. The secondary lip is in direct contact with the sealing surface of the thrust rib with the primary lip being slightly offset therefrom.

U.S. Pat. No. 4,819,949 also to Otto discloses a seal assembly for closing the end of a tapered roller bearing. The seal assembly disclosed therein is a unitized assembly which includes interlocked seal and shield portions. The seal portion is a two-piece unit which consists of a rigid case and a flexible sealing element. The rigid case is mounted to the outer ring of the bearing and the flexible sealing element is bonded to the outboard end of the rigid case. The flexible sealing element has a dirt lip directed obliquely toward and contacting the shield portion, and a secondary lip also directed obliquely toward the shield portion, but it is not in contact with the shield portion.

Radial lip seals which contact the sealing surface, like those disclosed in the Otto patents, are common. Although contacting lip seals adequately perform the sealing function, the contact between the lip and the sealing surface causes seal wear and a loss of power in the rotating system due to friction between the two surfaces. In addition to the interference between the lip and the sealing surface, the elasticity of the rubber element and the spring force (if used) applied thereto creates a radial load which results in additional torque requirements.

There is a need therefore for a seal assembly which excludes contaminants, such as water and dirt, from within the interior bearing chamber and retains the lubricant therein, while requiring less torque to rotate than a conventional radial lip seal.

SUMMARY OF THE INVENTION

The subject disclosure relates to a unitized seal assembly for use with roller or ball bearing assemblies which include outer and inner rings or cylinders that define a bearing chamber therebetween. The outer bearing cylinder/ring is adapted and configured for engagement with a housing member and the inner cylinder/ring is adapted and configured for engagement with an axle which rotates relative to the housing member or vise versa.

The unitized seal assembly of the present disclosure excludes contaminants from entering the bearing chamber defined between the outer and the inner bearing cylinders. The seal assembly includes a radially outer ring and a radially inner deflector ring. The outer ring includes a casing which has an axially inner and an axially outer end and a first shield element. The first shield element is engaged with the outer end of the casing and defines a first sealing face.

The radially inner deflector ring is positioned adjacent to the outer end of the casing and includes a support member and a second shield element. The support member is configured so as to form a shield cavity. The second shield element is disposed with the shield cavity and includes a second sealing face. The second sealing face is dimensioned and configured so as to correspond to the first sealing face such that when the first shield element is positioned in non-contacting proximity to the second shield element, a circuitous sealing labyrinth is formed between the first sealing face and the second sealing face.

Preferably, the seal assembly further includes a highly viscous fluid which is disposed within the labyrinth formed between the sealing faces of the first and the second shield elements. It is presently envisioned that the highly viscous fluid is a water insoluble grease. Alternatively, the highly viscous fluid can be a ferrofluid for use with magnetic or magnetized shield elements.

It is also presently preferred that the outer end of the casing includes a ventilation mechanism for exhausting the bearing chamber. In a representative embodiment, the ventilation mechanism is formed by positioning a semi-permeable membrane over at least one aperture formed in the outer end of the casing, the semi-permeable membrane permitting the exchange of air therethrough.

It is presently envisioned that the first shield element is molded from a rubber or nylon material and the second shield element is formed from a flexible polymer. Alternatively, both shield elements can be manufactured from a magnetic polymer, a conventional magnet or be partly manufacture from these materials. However, those skilled in the art will readily appreciate that other materials and processes of manufacture can be used to manufacture the shield elements without departing from the inventive aspects of the present disclosure.

In a first representative embodiment, the first sealing face of the first shield element is convex. Alternatively, the first sealing face of the first shield element can include first and second flexible lip extensions. Still further, the first sealing face of the first shield element can have a series of recesses formed therein. In this embodiment, the first shield element and the second shield element are positioned so as to be interdigitated.

In a preferred embodiment, the first shield element further includes a plurality of pumping cavities which extend between an interior face of the first shield element and the sealing labyrinth. Each pumping cavity is adapted and configured so as to direct fluid contained therein towards the bearing chamber when the inner deflector ring rotates with respect to the outer ring. Alternatively, the second shield element can include the pumping cavities. These pumping cavities extend between an interior face of the second shield element and the sealing labyrinth. Each pumping cavity is adapted and configured so as to direct fluid contained therein towards the bearing chamber when the inner deflector ring rotates with respect to the outer ring.

It is also presently preferred that the inner deflector ring further includes a lip portion which is configured so as to retain the first shield element of the outer ring within the shield cavity so as to unitize the seal assembly.

The present disclosure is also directed to a bearing assembly which includes an outer cylinder, an inner cylinder, a plurality of bearings, and a unitized seal assembly. The outer cylinder of the bearing assembly has axially opposed first and second ends and defines a first race surface on its inner diameter and a central axis for the bearing assembly.

The inner cylinder is coaxially positioned within the outer cylinder and defines a second race surface on its outer diameter. A bearing chamber is defined between the outer cylinder and the inner cylinder. The plurality of bearings are disposed within the bearing chamber and are in rolling contact with the first and the second race surfaces. Each bearing facilitates the rotational movement of the inner cylinder with respect to the outer cylinder or vise versa. The outer ring includes a casing which has an axially inner and an axially outer end and a first shield element. The first shield element is engaged with the outer end of the casing and defines a first sealing face.

The radially inner deflector ring is positioned adjacent to the outer end of the casing and includes a support member and a second shield element. The support member is configured so as to form a shield cavity. The second shield element is disposed with the shield cavity and includes a second sealing face. The second sealing face is dimensioned and configured so as to correspond to the first sealing face such that when the first shield element is positioned in non-contacting proximity to the second shield element, a circuitous sealing labyrinth is formed between the first sealing face and the second sealing face.

Similar to the previously described embodiments, preferably the seal assembly further includes a highly viscous fluid which is disposed within the labyrinth formed between the sealing faces of the first and the second shield elements. It is presently envisioned that the highly viscous fluid is a water insoluble grease.

The present disclosure is also directed to a unitized seal assembly for sealing a bearing chamber defined between outer and inner bearing cylinders wherein the outer bearing cylinder is adapted and configured for engagement with a housing and the inner bearing cylinder is adapted and configured for engagement with an axle, wherein the axle rotates relative to the housing or vise versa.

The unitized seal assembly includes first and second seal portions. The first seal portion is adapted and configured for engagement with the radially outer bearing cylinder and includes a first shield element which defines a first non-planar sealing face. The second seal portion is adapted and configure for engagement with the axle and positioned in non-contacting proximity to the first seal portion. The second seal portion includes a second shield element which defines a second non-planar sealing face. The second non-planar sealing face is dimensioned and configured so as to correspond to the first non-planar sealing face of the first shield element such that when the first shield element is positioned in non-contacting proximity to the second shield element, a circuitous sealing labyrinth is formed between the first and the second sealing faces.

Those skilled in the art will readily appreciate that the unitized seal assembly of the subject disclosure excludes contaminants from within the bearing chamber and prevents lubricant from escaping therefrom while requiring less torque to rotate, thereby reducing power losses in the rotating system. These and other unique features of the unitized seal assembly disclosed herein will become more readily apparent from the following description, the accompanying drawings and the appended claims.

BRIEF DESCRIPTION OF THE DRAWINGS

So that those having ordinary skill in the art to which the subject disclosure appertains will more readily understand how to make and use the same, reference may be had to the drawings wherein.

These and other features of the subject disclosure will become more readily apparent to those having ordinary skill in the art from the following detailed description of preferred embodiments.

DETAILED DESCRIPTION OF PREFERRED EMBODIMENTS

Figure 1:
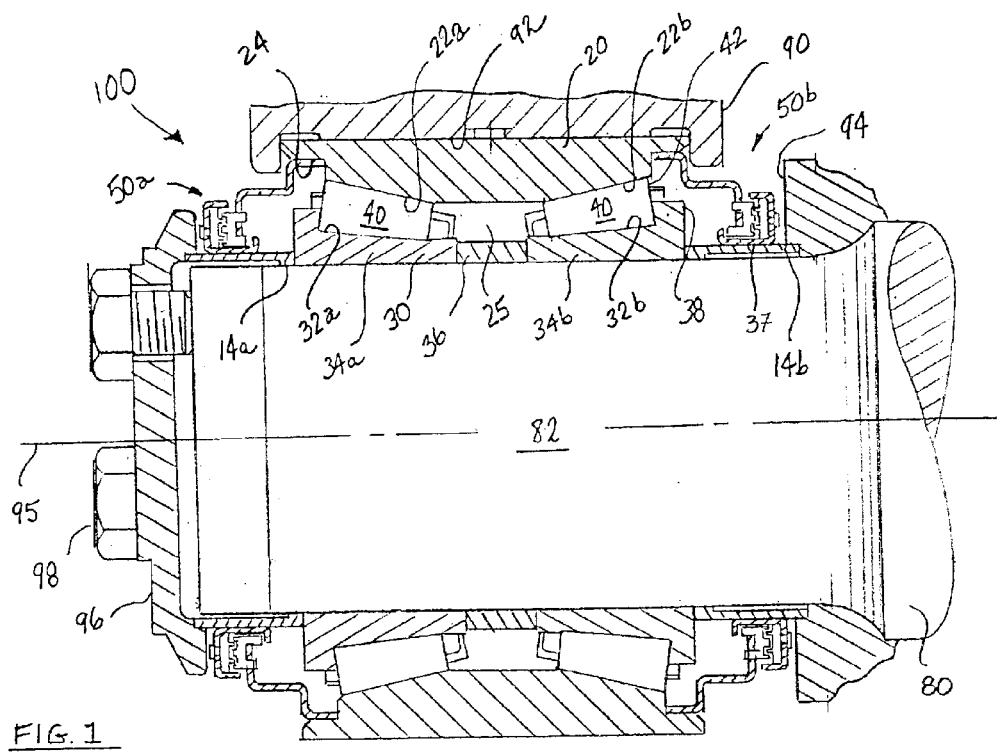
FIG. 1 is a cross-sectional view of an installed unitized bearing assembly which is constructed in accordance with a preferred embodiment of the subject application, the bearing assembly including a double row tapered roller bearing and first and second axially opposed unitized seals.

Referring now to the drawings wherein like reference numerals identify similar elements of the subject invention, there is illustrated in FIG. 1 a unitized bearing seal assembly constructed in accordance with a preferred embodiment of the subject disclosure and designated generally by reference numeral 100. Bearing seal assembly 100 includes bearing component 10 and axially opposed first and second interlocking seal assemblies 50a and 50b.

Bearing component 10 is a two row tapered roller bearing which includes an outer ring or double cup 20, an inner ring 30, and a plurality of circumferencially-spaced apart tapered rollers 40 disposed within an interior chamber 25 defined between the cup 20 and the inner ring 30. Angled surfaces 22a and 22b are formed on the interior portion of cup 20 and are oriented so as to correspond with the taper angle of rollers 40. Similarly, inner ring 30 includes angled surfaces 32a and 32b which are also oriented so as to correspond to the taper angle of rollers 40. Surfaces 22a, 22b, 32a and 32b provide smooth, hard surfaces or raceways for rollers 40. As a result, the cup 20 can slidably rotate with respect to the inner ring 30 or vise versa.

In the embodiment shown herein, inner ring 30 is a three-piece assembly which includes first and second cone portions 34a and 34b, separated by spacer ring 36. Alternatively, the inner ring 30 can be fabricated as a single piece. Inner ring 30 also includes thrust ribs 38 which are dimensioned and configured so as to maintain the axial position of rollers 40. More specifically, ends 42 of rollers 40 are adjacent to and abut against the thrust ribs 38, and thereby thrust ribs 38 prevent the rollers 40 from being dislodged from the raceways when the bearing component 10 is subjected to radial loads.

As noted above, bearing seal assembly 100 also includes axially opposed first and second interlocking seal assemblies 50a and 50b, each being positioned at an end of bearing component 10 so as to exclude contaminants from entering chamber 25 and maintain the lubricant therein. Seal assemblies 50a and 50b include a radially outer ring or casing 60 and a radially inner deflector ring 70. The outer casing 60 is engaged with counterbore 24 formed in the cup 20 and the inner deflector ring 70 is positioned around the journal 82 of axle 80. Seal assemblies 50a and 50b will be described in more detail herein below with respect to FIG. 2.

With continuing reference to FIG. 1, unitized bearing seal assembly 100 is positioned over axle 80 so as to facilitate the rotational movement of axle 80 with respect to housing 90. The inner diameter 37 of inner ring 30 is dimension such that it fits around journal 82 on the end of an axle 80. The bearing component 10 is received within recess 92 formed in housing 90 and permits the axle 80 to rotate with respect to housing 90, about an axis 95 of rotation. Bearing component 10 is clamped on the journal 82 between a backing ring 94 and an end cap 96, the latter being urged toward the former by cap screws 98 which thread into the end of the journal 82. Neither the backing ring 94 nor the end cap 96 bear directly against bearing component 10, but instead they exert the clamping force through spacer rings 14a and 14b that likewise encircle the journal 82.

In the operation of bearing seal assembly 100, the two rows of tapered rollers 40 allow the axle 80 and inner ring 30 to rotate with respect to the housing 90 and cup 20 or vise versa. Additionally, the outer casing 60 of the seal assembly 50 is fixed with respect to cup 20 and rotates relative to axle 80 and inner deflector ring 70. A lubricant, such as grease, is provided in chamber 25 to reduce the rolling friction and thereby facilitate the rotational movement. During rotation, the tapered rollers 40 tend to pump the lubricant outwardly towards the thrust ribs 38.

Figure 2:
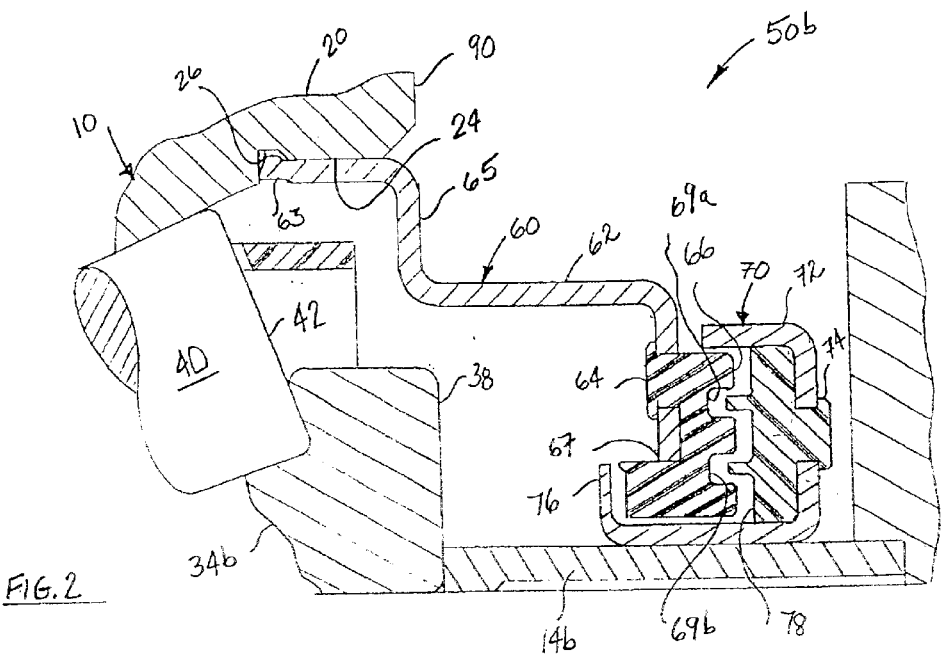
FIG. 2 illustrates an enlarged cross-sectional view of the unitized, interlocked seal of FIG. 1 which includes a radially outer casing that is engaged with the bearing cup member and a radially inner deflector ring installed over the axle shaft.

Referring now to FIG. 2, there is illustrated seal assembly 50b shown engaged with bearing component 10. As stated above, seal assembly 50b includes an outer casing 60 and an inner deflector ring 70 which are interlocked so as to form a unitized seal. Both the casing 60 and the deflector ring 70 extend 360 degrees around axle 80. Outer casing 60 includes a rigid case 62 and a shield element 64. Case 62 is manufactured preferably from steel using a metal stamping process or a similar metal forming technique. Case 62 includes a first end portion 63, a second end portion 67 and a radial portion 65. First end portion 63 is adapted and configured for engagement with counterbore 24 of cup 20. More specifically, in the embodiment shown herein, counterbore 24 includes a recess 26 which receives a protuberance associated with the first end portion 63 of case 62 and fixes the axial position of the casing 60. Radial portion 65 provides a flat surface perpendicular to axis 95 (see FIG. 1) which facilitates the installation and engagement of the case 62 with the counterbore 24 and therefore, the installation of the seal assembly 50b. Shield element 64 is engaged with second end 67 of case 62 preferably by a staking operation or similar joining technique.

Figure 3:
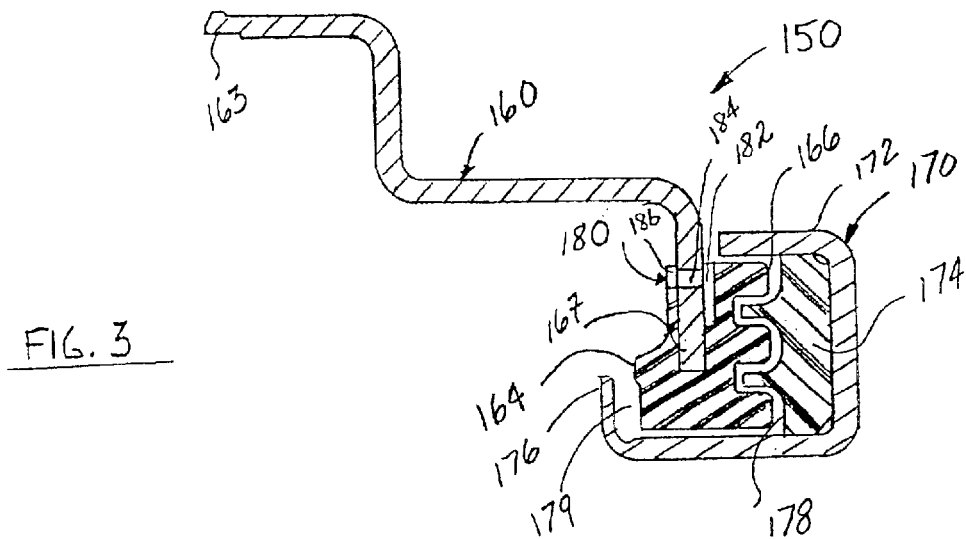
FIG. 3 is a cross-sectional view of an alternate embodiment of the unitized seal assembly of the present disclosure, wherein first and second elastomeric or plastic shield elements define a labyrinth pathway.
Figure 4:
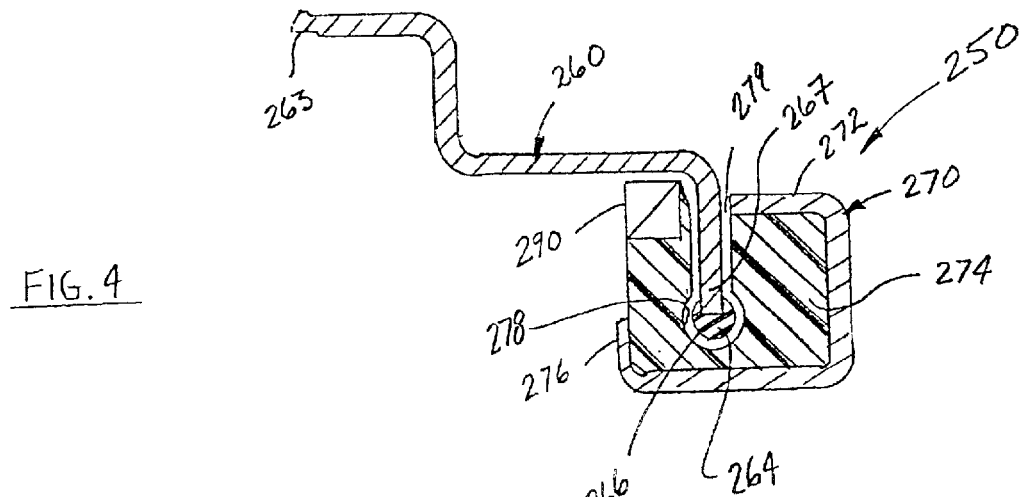
FIG. 4 is a cross-sectional view of an alternate embodiment of the unitized seal assembly of the present disclosure, wherein the first shield element which is associated with the outer casing has a substantially circular cross-section.
Figure 5:
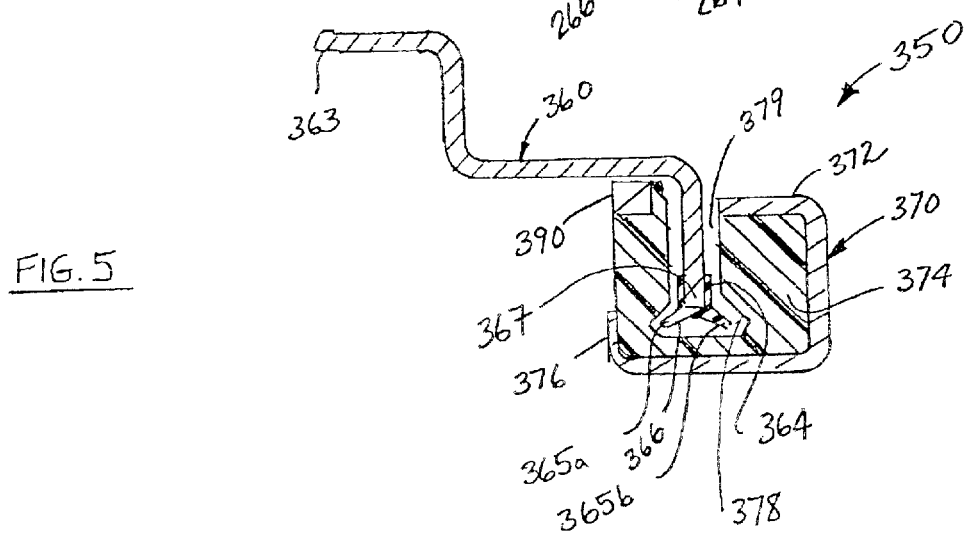
FIG. 5 is a cross-sectional view of an alternate embodiment of the unitized seal assembly of the present disclosure, wherein the first shield element which is associated with the outer casing has a substantially V-shaped cross-section.

A non-planer surface 66 is formed in the outboard end of shield element 64. The non-planar sealing surface 66, as described in this figure, has a series of recess 69a and 69b formed therein. Those skilled in the art would readily appreciate that the number, size and configuration of the recesses 69a and 69b can vary or be adjusted based on the operating requirements of the bearing seal assembly 100 without departing from the scope of the inventive aspects disclosed herein. FIGS. 3, 4 and 5 which will be discussed below provide representative embodiments of alternate non-planar surface configurations. Shield element 64 is preferably molded nitrile rubber although other materials may be employed.

Deflector ring 70 is positioned over axle 80 and is engaged with spacer 14b preferably by means of a press-fit. Deflector ring 70 includes a support portion 72 and a shield element 74. Support portion 72 is substantially U-shaped, with the exception of the lip portion 76. Seal element 74 is engaged with the support portion 72 and is preferably manufactured from a plastic, a rubber, or other suitable water-resistant, lubricant-resistant material, such as for example nylon. This engagement is preferably achieved by a staking operation, but it can be achieved by bonding or any other suitable attachment mechanism.

The inboard surface 78 of shield element 74 is also non-planar and corresponds with the non-planar surface 66 formed in the outboard end of shield element 64. The two opposed, non-contacting surfaces 66 and 78 form a circuitous or winding labyrinth path therebetween from the interior bearing chamber 25 to the exterior of the bearing seal assembly 100. This path prevents dirt and water from entering the bearing chamber 25 and lubricant from being expelled therefrom.

During operation of the bearing seal assembly 100, the two surfaces 66 and 78 cooperate to provide a non-contacting seal which reduces the amount of friction normally associated with the sealing of bearings. A non-contacting seal also reduces the overall power losses of the revolving system. The labyrinth defined between the two shield elements 64 and 74 is preferably filled with a viscous lubricant, such as a water insoluble grease. The grease within the labyrinth aids in the retaining of the lubricant within the interior chamber and the exclusion of contaminant therefrom. As a result, bearing seal assembly 100 requires less torque to rotate than conventional radial lip seals, due to the low shear strength of the grease.

Referring now to FIG. 3 which illustrates a unitized seal assembly constructed in accordance with a second embodiment of the subject disclosure and designated by reference numeral 150. Unitized seal assembly 150 is similar in structure and function to seal assembly 50b, more particularly, seal assembly 150 functions to seal a bearing chamber defined between outer and inner bearing cylinders (not shown).

Similar to the seal assembly 50b of FIG. 2, seal assembly 150 includes a radially outer casing 160 and a radially inner deflector ring 170. The radially outer casing 160 has inboard and outboard ends 163 and 167 receptively. The outboard end 163 has a first shield element 164 engaged therewith which defines a first non-planar sealing face 166. The radially inner deflector ring 170 includes a support member 172 and a second shield element 174. The support member 172 is substantially U-shaped in cross-section and forms a shield cavity 179. A lip portion 176 is provided on an end of support member 172 so as to unitize seal assembly 150. The second shield element 174 is disposed within shield cavity 179 and includes a second non-planar sealing face 178. Second non-planar sealing face 178 is dimensioned and configured so as to correspond to the first sealing face 166 such that when the first shield element 164 is positioned in interdigitating, non-contacting proximity to the second shield element 174, a circuitous labyrinth is formed between the first and second sealing faces, 166 and 178 respectively.

Similar to shield assembly 50b, seal assembly 150 includes a highly viscous fluid disposed within the labyrinth formed between the sealing faces 166 and 178 of the first and the second shield elements, 164 and 174 respectively. Preferably the highly viscous fluid is a water insoluble grease Unlike seal assembly 50b, the outboard end 167 of casing 160 includes ventilation mechanism 180 for exhausting bearing chamber 25 (FIG. 1). During operation, bearing chamber 25, which contains tapered rollers 40 and lubricant, experiences wide variations in temperature. Normally, the variation in temperature would significantly affect the pressure within the chamber. However, ventilation mechanism 180 is provided so as to ventilate or exhaust the bearing chamber 25. As illustrated herein, ventilation mechanism 180 includes a semi-permeable membrane 182 which is positioned over apertures 184 and 186 formed in the outboard end of outer casing 160 and inboard portion of first shield segment 164. The semi-permeable membrane, in combination with apertures 184 and 186, provides an exhaust path from bearing chamber 25 to the exterior of the bearing seal assembly. Those skilled in the art would readily appreciated that the number of ventilation mechanisms can vary based on the temperature characteristics of the bearing seal assembly.

With continuing reference to FIG. 3, shield elements 164 and 174 are similar in configuration to shield elements 64 and 74 of seal assembly 50b. However, as can be readily appreciated by comparison of FIGS. 2 and 3, shield elements 164 and 174 are more closely interlocked than shield elements 64 and 74, thereby forming a tighter labyrinth pathway therebetween.

Referring now to FIG. 4, there is illustrated a seal assembly 250 which is similar in structure and function to seal assemblies 50a, 50b and 150. Seal assembly 250 is adapted and configured to seal a bearing chamber defined between outer and inner bearing cylinders (not shown). Structural elements of seal assembly 250 which are similar to and correspond to those already described for seal assembly 50b have been identified with similar reference numerals.

Similar to the seal assembly 50b of FIG. 2, seal assembly 250 includes a radially outer casing 260 and a radially inner deflector ring 270. The radially outer casing 260 has inboard and outboard ends 263 and 267 receptively. The outer end 263 has a first shield element 264 engaged therewith which defines a first non-planar sealing face 266. The radially inner deflector ring 270 includes a support member 272 and a second shield element 274. The support member 272 is substantially U-shaped in cross-section and forms a shield cavity 279. A lip portion 276 is provided on the inner end of support member 272 so as to unitize seal assembly 250. The second shield element 274 is disposed within shield cavity 279 and includes a second non-planar sealing face 278 which is dimensioned and configured so as to correspond to the first sealing face 266 such that when the first shield element 264 is positioned in non-contacting proximity to the second shield element 274, a circuitous sealing labyrinth is formed between the first and second sealing faces, 266 and 278, respectively.

Unlike the previously described embodiments, the first shield element 264 has a substantially circular cross-section and is entirely disposed within a circular cavity defined by the second shield element 274. Additionally, seal assembly 250 includes a plurality of pumping grooves 290 formed in first shield element 164. During operation, these grooves 290 redirect lubricant which is being forced outboard of the bearing chamber 25 (FIG. 1) by the rotational movement of bearing component 10, back towards the bearing chamber. Grooves 290 are similar to pumping cavities 86 described in U.S. Pat. No. 4,819,949 to Otto. The disclosure provided therein, limited to the portions concerning pumping cavities 86, is herein incorporated by reference. It should be noted that the pumping cavities of the Otto disclosure are associated with the first shield element, whereas grooves 290 are formed in the second shield element 274.

Referring now to FIG. 5, there is illustrated a seal assembly 350 which is similar in structure and function to seal assemblies 50a, 50b, 150 and 250. Seal assembly 350 is adapted and configured to seal a bearing chamber defined between outer and inner bearing cylinders (not shown). Structural elements of seal assembly 350 which are similar to and correspond to those already described for seal assembly 50b have been identified with similar reference numerals.

The seal created by seal assembly 350 differs from the previously described embodiment. As before, seal assembly 350 includes a radially outer casing 360 and a radially inner deflector ring 370. The radially outer casing 360 has inboard and outboard ends 363 and 367 receptively. The outboard end 363 has a first shield element 364 engaged therewith which defines a first non-planar sealing face 366. Non-planar sealing face includes first and second flexible lip extensions 365a and 365b.

The radially inner deflector ring 370 includes a support member 372 and a second shield element 374. The second shield element 374 is disposed within shield cavity 379 and includes a second non-planar sealing face 378. The second non-planar sealing face is dimensioned and configured so as to correspond to the first sealing face 366 such that when the first shield element 364 is positioned in non-contacting proximity to the second shield element 374, a sealing labyrinth is formed between the first and second sealing faces, 366 and 378, respectively.

Figure 6:
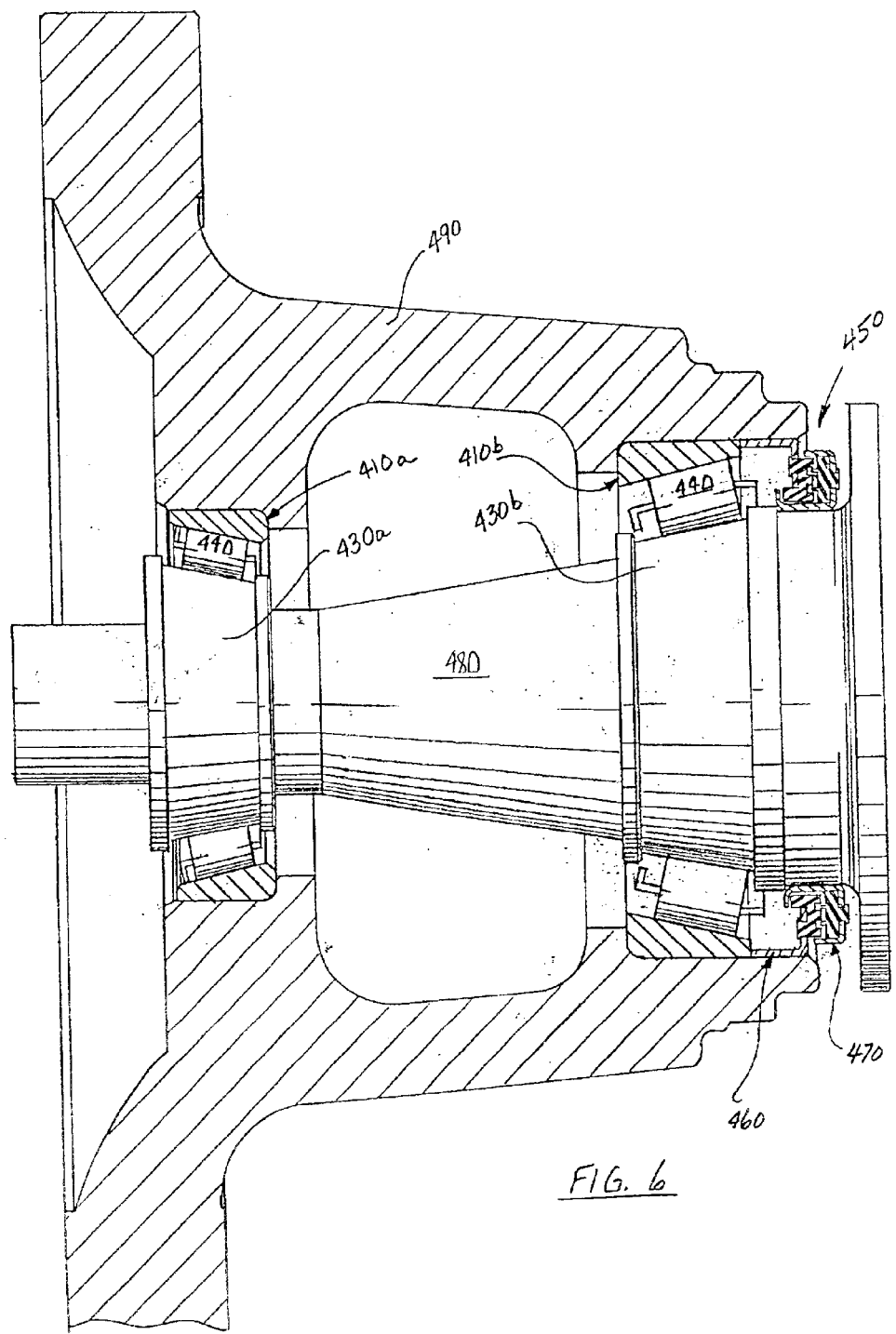
FIG. 6 is a cross-sectional view illustrating two seal assemblies installed in a heavy truck application, each seal having a configuration similar to the seal assembly of FIGS. 1 and 2.

Referring now to FIG. 6, there is illustrated seal assembly 450 shown installed in a representative trucking application. In this trucking application, a hub member 490 is mounted for relative rotation on axle 480. Axle 480 includes outboard and inboard bearing journals, 430a and 430b, respectively. Bearing components 410a and 410b are disposed within interior chambers 432a and 432b which are defined between hub 490 and journals 430a and 430b. Bearing components 410a and 410b include a plurality of tapered roller bearings 440 and allow hub 490 to rotate relative to stationary axle 480.

Seal assembly 450 is similar in structure and function to seal assembly 50b of FIGS. 1 and 2. Seal assembly 450 includes an outer casing 460 and an inner deflector ring 470 which are interlocked so as to form a unitized seal. Both the casing 460 and the deflector ring 470 which extend 360 degrees around axle 480. Outer casing 460 includes a rigid case and a shield element. Casing 460 is adapted and configured for engagement with hub 490 so as to rotate therewith. In the embodiment shown herein, casing 460 is press-fit into a counterbore formed in hub 490. Similar to seal assembly 50b, a non-planer surface is formed on the outboard end of the shield element which is associated with casing 460. Those skilled in the art will readily appreciate that other techniques for engaging the casing 460 with hub 490 can be utilized or that the casing 460 can be alternatively engaged with a cup member which is part of bearing component 410b.

Deflector ring 470 is positioned over axle 480 and is engaged therewith preferably by means of a press-fit. Deflector ring 470 includes a support portion and a shield element. The support portion is substantially U-shaped, with the exception of a lip portion. A second seal element is engaged with the support portion and is preferably manufactured from a plastic, a rubber, or other suitable water-resistant, lubricant-resistant material, such as for example nylon. This engagement is preferably achieved by a staking operation, but it can be achieved by bonding or any other suitable attachment mechanism.

The shield element associated with the deflector ring also includes a non-planar sealing face. This face is configured to correspond with the non-planar surface formed in the shield element of casing 460. The two opposed, non-contacting surfaces form a circuitous or winding labyrinth path therebetween. This path prevents dirt and water from entering the bearing chamber and lubricant from being expelled therefrom.

The labyrinth defined between the two shield elements is preferably filled with a viscous lubricant, such as a water insoluble grease. The grease within the labyrinth aids in the retaining of the lubricant within the interior chamber and the exclusion of contaminant therefrom.

For all of the previously described embodiments, preferred materials of manufacture were provided for the sealing elements associated with the casings and the deflector ring. Also, it was identified that the labyrinth formed between the two sealing elements could be filled with a lubricant, such as water insoluble grease. Alternatively, magnetic sealing elements can be used in lieu of the rubber or elastomeric sealing elements. The magnetic sealing elements would be dimensioned and configured in a manner similar to the previously described seals. However, the sealing elements would be formed from or would include conventional magnets. Alternatively, the sealing components can be manufactured from a magnetic polymer. One type of magnetic polymer is created by inserting magnetized metallic fibers or ions into the polymeric matrix. Other magnetic polymers are fabricated by using recently developed carbon-based magnet technology.

Additionally, the labyrinth defined between the sealing elements can be filled with a ferrofluid. A ferrofluid is a stable colloidal suspension of sub-domain magnetic particles in a liquid carrier. The particles, which have an average size of about 100 Å (10 nm), are coated with a stabilizing dispersing agent (surfactant) which prevents particle agglomeration even when a strong magnetic field gradient is applied to the ferrofluid. A typical ferrofluid may contain by volume 5% magnetic solid, 10% surfactant and 85% carrier.

In the absence of a magnetic field, the magnetic moments of the particles are randomly distributed and the fluid has no net magnetization. When a magnetic field is applied to a ferrofluid, the magnetic moments of the particles orient along the field lines almost instantly. The magnetization of the ferrofluid responds immediately to the changes in the applied magnetic field and when the applied field is removed, the moments randomize quickly. In a gradient field the whole fluid responds as a homogeneous magnetic liquid which moves to the region of highest flux. This means that ferrofluids can be precisely positioned and controlled by an external magnetic field. The forces holding the magnetic fluid in place are proportional to the gradient of the external field and the magnetization value of the fluid. This means that the retention force of a ferrofluid can be adjusted by changing either the magnetization of the fluid or the magnetic field in the region.

The selection of ferrofluid depends on many factors such as environments, operating life, etc. There are many different combinations of saturation magnetization and viscosity resulting in a ferrofluid suitable for every application. The operating life of the product depends on the volatility of the ferrofluid. Products that require long life must use ferrofluids with low evaporation rate or vapor pressure. Also, seals operating at high vacuum must incorporate low vapor pressure fluids. The lower the volatility, the higher the viscosity of the ferrofluid. U.S. Pat. No. 5,013,471 to Ogawa discloses a method for producing a ferrofluid.

The ferrofluid is secured in the labyrinth defined between the magnetic sealing elements by the magnetic force or flux. The ferrofluid establishes an airtight seal which prevents contaminants in the form of particles or gas from entering the bearing chamber, while minimizing frictional forces during the rotation.

While the unitized seal assembly of the present disclosure has been described with respect to preferred embodiments, those skilled in the art will readily appreciate that various changes and/or modifications can be made to the invention without departing from the spirit or scope of the invention as defined by the appended claims.

What is claimed is:

1. A unitized seal assembly for sealing a bearing chamber defined between outer and inner bearing cylinders, the outer bearing cylinder is adapted and configured for engagement with a housing and the inner cylinder is adapted and configured for engagement with an axle, wherein relative movement exists between the axle and the housing, the unitized seal assembly comprising:

a) a radially outer ring which includes a casing and a first shield element, the casing having axially inner and axially outer ends, the first shield element being engaged with the outer end of the casing and defining a first sealing face; and b) a radially inner deflector ring positioned adjacent to the outer end of the casing, the deflector ring including a support member and a second shield element, the support member forming a shield cavity wherein the second shield element is disposed, the second shield element including a second sealing face; wherein said first and second sealing faces are dimensioned and configured such that when the first shield element is positioned in non-contacting proximity to the second shield element, a circuitous sealing labyrinth is formed between the first sealing face and the second sealing face, and wherein at least a portion of said circuitous sealing labyrinth is formed by the space between at least one recess in one of the first and second sealing faces and at least one complementary protrusion on the other of the first and second sealing faces.

2. A seal assembly as recited in claim 1, further comprising a highly viscous fluid disposed within the labyrinth formed between the sealing faces of the first and the second shield elements.

3. A seal assembly as recited in claim 2, wherein the highly viscous fluid comprises a water insoluble grease.

4. A seal assembly as recited in claim 2, wherein the highly viscous fluid is a ferrofluid.

5. A seal assembly as recited in claim 1, wherein the outer end of the casing includes ventilation means for exhausting the bearing chamber.

6. A seal assembly as recited in claim 5, wherein the ventilation means includes a semi-permeable membrane positioned over at least one aperture formed in the outer end of the casing.

7. A seal assembly as recited in claim 1, wherein the first shield element comprises molded rubber material.

8. A seal assembly as recited in claim 1, wherein the first shield element and the second shield element include a conventional magnet.

9. A seal assembly as recited in claim 1, wherein the first shield element and the second shield element include a magnetic polymer.

10. A seal assembly as recited in claim 1, wherein the second shield element is formed from a flexible polymer.

11. A seal assembly as recited in claim 1, wherein the first sealing face of the first shield element is convex.

12. A seal assembly as recited in claim 1, wherein the first sealing face of the first shield element includes first and second flexible lip extensions.

13. A seal assembly as recited in claim 1, wherein the first sealing face of the first shield element has a series of recesses formed therein and the first shield element and the second shield element are positioned so as to be interdigitated.

14. A seal assembly as recited in claim 1, wherein the first shield element further includes a plurality of pumping cavities which extend between an interior face of the first shield element and the sealing labyrinth, each pumping cavity adapted and configured so as to direct fluid contained therein towards the bearing chamber when the inner deflector ring rotates with respect to the outer ring.

15. A seal assembly as recited in claim 1, wherein the second shield element further includes a plurality of pumping cavities which extend between an interior face of the second shield element and the sealing labyrinth, each pumping cavity adapted and configured so as to direct fluid contained therein towards the bearing chamber when the inner deflector ring rotates with respect to the outer ring.

16. A seal assembly as recited in claim 1, wherein the inner deflector ring further includes a lip portion which is configured so as to retain the first shield element of the outer ring within the shield cavity so as to unitize the seal assembly.

17. A bearing assembly comprising:
a) an outer cylinder having axially opposed first and second ends, the outer cylinder defining a first race surface on an inner diameter thereof and a central axis for the bearing assembly;
b) an inner cylinder coaxially positioned within the outer cylinder and defining a second race surface on an outer diameter thereof, wherein a bearing chamber is defined between the outer cylinder and the inner cylinder;
c) a plurality of bearings disposed within the bearing chamber and in rolling contact with the first and the second race surfaces, each bearing facilitating a relative rotational movement which exists between the inner cylinder and the outer cylinder; and
d) a unitized seal assembly associated the first end of the outer cylinder, the unitized seal assembly including:
i) a radially outer ring which includes a casing and a first shield element, the casing having axially inner and axially outer ends, the first shield element being engaged with the outer end of the casing and defining a first sealing face; and
ii) a radially inner deflector ring positioned adjacent to the outer end of the casing, the deflector ring including a support member and a second shield element, the support member forming a shield cavity and having the second shield element disposed therein, the second shield element including a second sealing face;
wherein said first and second sealing faces are dimensioned and configured such that when the first shield element is positioned in non-contacting proximity to the second shield element, a circuitous sealing labyrinth is formed between the first and the second sealing faces, and wherein at least a portion of said circuitous sealing labyrinth is formed by the space between at least one recess in one of the first and second sealing faces and at least one complementary protrusion on the other of the first and second sealing faces.

18. A seal assembly as recited in claim 17, further comprising a highly viscous fluid disposed within the labyrinth formed between the sealing faces of the first and the second shield elements.

19. A seal assembly as recited in claim 18, wherein the highly viscous fluid comprises a water insoluble grease.

20. A seal assembly as recited in claim 18, wherein the highly viscous fluid is a ferrofluid.

21. A seal assembly as recited in claim 17, wherein the outer end of the casing includes ventilation means for exhausting the bearing chamber.

22. A seal assembly as recited in claim 21, wherein the ventilation means includes a semi-permeable membrane positioned over at least one aperture formed in the outboard end of the casing.

23. A seal assembly as recited in claim 17, wherein the first shield element comprises molded rubber.

24. A seal assembly as recited in claim 17, wherein the first shield element and the second shield element include a conventional magnet.

25. A seal assembly as recited in claim 17, wherein the first shield element and the second shield element include a magnetic polymer.

26. A seal assembly as recited in claim 17, wherein the second shield element is formed from a flexible polymer.

27. A seal assembly as recited in claim 17, wherein the first sealing face of the first shield element is convex.

28. A seal assembly as recited in claim 17, wherein the first sealing face of the first shield element includes first and second flexible lip extensions.

29. A seal assembly as recited in claim 17, wherein the first sealing face of the first shield element has a series of recesses formed therein and the first shield element and the second shield element are positioned so as to be interdigitated.

30. A seal assembly as recited in claim 17, wherein the first shield element further includes a plurality of pumping cavities which extend between an inboard face of the first shield element and the sealing labyrinth, each pumping cavity adapted and configured so as to direct fluid contained therein towards the bearing chamber when the inner deflector ring rotates with respect to the outer ring.

31. A seal assembly as recited in claim 17, wherein the second shield element further includes a plurality of pumping cavities which extend between an inboard face of the second shield element and the sealing labyrinth, each pumping cavity adapted and configured so as to direct fluid contained therein towards the bearing chamber when the inner deflector ring rotates with respect to the outer ring.

32. A seal assembly as recited in claim 17, wherein the inner deflector ring further includes a lip portion which is configured so as to retain the first shield element of the outer ring within the shield cavity so as to unitize the seal assembly.

33. A unitized seal assembly for sealing a bearing chamber defined between outer and inner bearing cylinders, the outer bearing cylinder being adapted and configured for engagement with a housing and the inner bearing cylinder being adapted and configured for engagement with an axle, wherein relative movement exists between the axle and the housing, the unitized seal assembly comprising:

a) a first seal portion adapted and configured for engagement with the radially outer bearing cylinder and including a first shield element defining a first non-planar sealing face; and b) a second seal portion adapted and configure for engagement with the axle and positioned in non-contacting proximity to the first seal portion, the second seal portion including a second shield element which includes a second non-planar sealing face;

wherein said first and second sealing faces are dimensioned and configured such that when the first shield element is positioned in non-contacting proximity to the second shield element, a circuitous sealing labyrinth is formed between first and the second sealing faces, and wherein at least a portion of said circuitous sealing labyrinth is formed by the space between at least one recess in one of the first and second sealing faces and at least one complementary protrusion on the other of the first and second sealing faces.

34. A seal assembly as recited in claim 33, further comprising a highly viscous fluid disposed within the labyrinth formed between the sealing faces of the first and the second shield elements.

35. A seal assembly as recited in claim 34, wherein the highly viscous fluid comprises a water insoluble grease.

36. A seal assembly as recited in claim 34, wherein the highly viscous fluid is a ferrofluid.

37. A seal assembly as recited in claim 33, wherein the outer end of the casing includes ventilation means for exhausting the bearing chamber.

38. A seal assembly as recited in claim 37, wherein the ventilation means includes a semi-permeable membrane positioned over at least one aperture formed in the outer end of the casing.

39. A seal assembly as recited in claim 33, wherein the first shield element comprises molded rubber material.

40. A seal assembly as recited in claim 33, wherein the first shield element and the second shield element include a conventional magnet.

41. A seal assembly as recited in claim 33, wherein the first shield element and the second shield element include a magnetic polymer.

42. A seal assembly as recited in claim 33, wherein the second shield element is formed from a flexible polymer.

43. A seal assembly as recited in claim 33, wherein the first sealing face of the first shield element is convex.

44. A seal assembly as recited in claim 33, wherein the first sealing face of the first shield element includes first and second flexible lip extensions.

45. A seal assembly as recited in claim 33, wherein the first sealing face of the first shield element has a series of recesses formed therein and the first shield element and the second shield element are positioned so as to be interdigitated.

46. A seal assembly as recited in claim 33, wherein the first shield element further includes a plurality of pumping cavities which extend between an interior face of the first shield element and the sealing labyrinth, each pumping cavity adapted and configured so as to direct fluid contained therein towards the bearing chamber when the inner deflector ring rotates with respect to the outer ring.

47. A seal assembly as recited in claim 33, wherein the second shield element further includes a plurality of pumping cavities which extend between an interior face of the second shield element and the sealing labyrinth, each pumping cavity adapted and configured so as to direct fluid contained therein towards the bearing chamber when the inner deflector ring rotates with respect to the outer ring.

48. A seal assembly as recited in claim 33, wherein the inner deflector ring further includes a lip portion which is configured so as to retain the first shield element of the outer ring within the shield cavity so as to unitize the seal assembly.

\* \* \* \* \*